(12) United States Patent
Shao et al.

(10) Patent No.: US 6,621,079 B1
(45) Date of Patent: Sep. 16, 2003

(54) APPARATUS AND METHOD FOR A NEAR FIELD SCANNING OPTICAL MICROSCOPE IN AQUEOUS SOLUTION

(75) Inventors: Zhifeng Shao, Charlottesville, VA (US); Gabor Szabo, Stanardsville, VA (US); Anders Mannelqvist, Vilhemina (SE)

(73) Assignee: University of Virginia Patent Foundation, Charlottesville, VA (US)

( * ) Notice: Subject to any disclaimer, the term of this patent is extended or adjusted under 35 U.S.C. 154(b) by 334 days.

(21) Appl. No.: 09/606,343

(22) Filed: Jun. 29, 2000

Related U.S. Application Data

(60) Provisional application No. 60/142,219, filed on Jul. 2, 1999.

(51) Int. Cl.[7] .................................................. G12K 7/00
(52) U.S. Cl. .................... 250/306; 250/243; 250/440.1; 250/440.2; 356/375; 356/376; 73/105; 75/105
(58) Field of Search ................................ 250/306, 234, 250/440.1, 440.2; 75/105; 356/375, 376; 73/105

(56) References Cited

U.S. PATENT DOCUMENTS

| 4,868,396 | A | | 9/1989 | Lindsay |
| 4,924,091 | A | | 5/1990 | Hansma et al. |
| 5,105,305 | A | * | 4/1992 | Betzig et al. ............ 250/227.14 |
| 5,298,975 | A | | 3/1994 | Khoury et al. |
| 5,319,977 | A | * | 6/1994 | Quate et al. ................ 250/306 |
| RE34,708 | E | | 8/1994 | Hansma et al. |
| 5,753,814 | A | | 5/1998 | Han et al. |
| 5,821,409 | A | | 10/1998 | Honma et al. |
| 5,838,000 | A | | 11/1998 | Mertesdorf et al. |
| 5,850,038 | A | | 12/1998 | Ue |
| 5,894,122 | A | | 4/1999 | Tomita |
| 5,994,691 | A | | 11/1999 | Konada |

* cited by examiner

Primary Examiner—John R. Lee
Assistant Examiner—Erin-Michael Gill
(74) Attorney, Agent, or Firm—Robert J. Decker

(57) ABSTRACT

The present invention near field scanning optical microscope NSOM, and related method thereof, provides a high resolution image of a sample in aqueous solution without damaging the sample. This attribute will greatly expand the applications and utility of a NSOM in biomedicine, among other fields. Moreover, the NSOM can be further extended to include signals other than light. In operation, a pipette is filled with an electrolyte solution (aqueous solution) and lowered through the reservoir toward the surface of the sample while the current between the electrode inside the pipette and the electrode in the reservoir is monitored. As the tip of the pipette approaches the surface, the ion current decreases because the space through which ions can flow is reduced. The pipette is then scanned laterally over the surface and the path of the tip pipette follows the topography of the surface. An optical image is simultaneously provided as the light source is incident on the sample and the emitted light reaches the image acquisition device after being transmitted through the sample. The acquisition device converts the light energy into electrical signals where they are processed for displaying the acquired images on the monitor or printer.

15 Claims, 6 Drawing Sheets

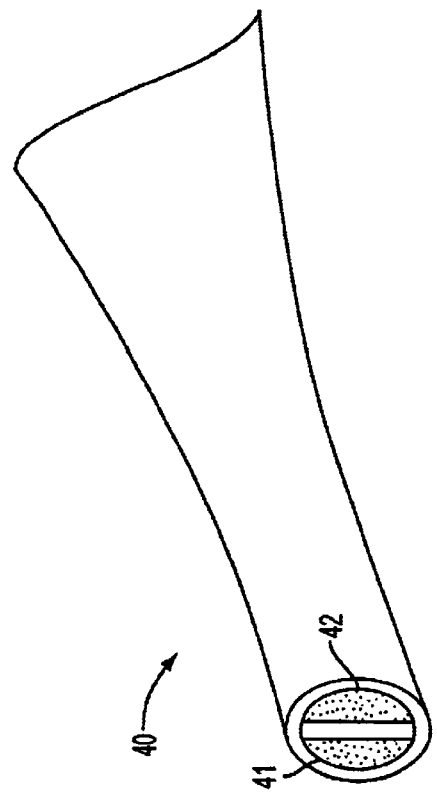
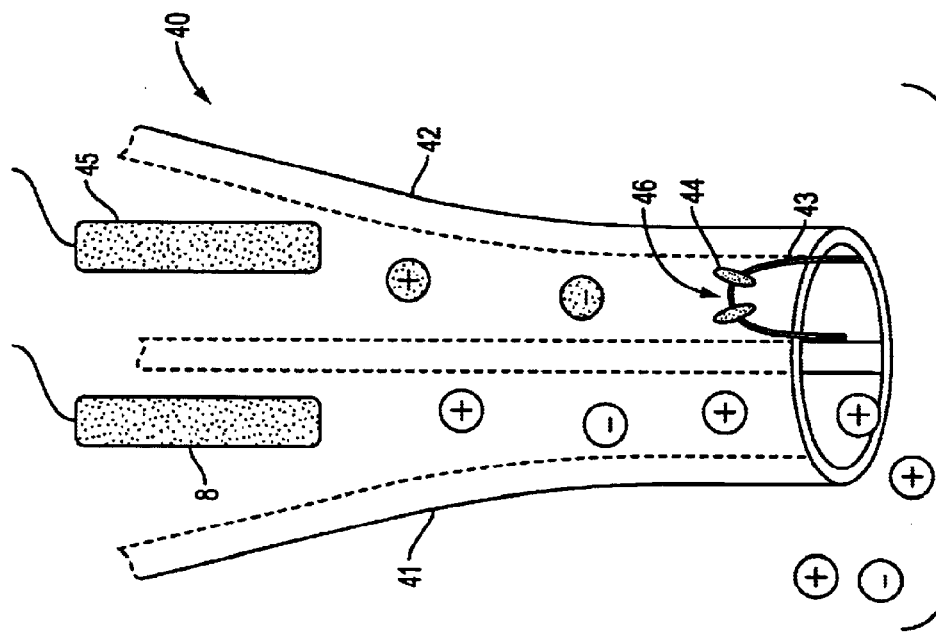

APPARATUS AND METHOD FOR A NEAR FIELD SCANNING OPTICAL MICROSCOPE IN AQUEOUS SOLUTION

CROSS-REFERENCES TO RELATED APPLICATIONS

The present invention claims priority from U.S. Provisional Patent Application Serial No. 60/142,219 filed Jul. 2, 1999, entitled "Scanning Near Field Microscope in Aqueous Solution," the entire disclosure of which is hereby incorporated by reference herein.

U.S. GOVERNMENT RIGHTS

This invention was made with United States Government support under Grant No. DBI9730060, awarded by National Science Foundation and Grant No. RR07720, awarded by National Institute of Health. The United States Government has certain rights in the invention.

FIELD OF THE INVENTION

The present invention is directed to an apparatus and method for a near field scanning optical microscope, and more particularly optically recording near field images of living cells in an aqueous solution at a resolution higher than 50 nm, more than ten times greater than the wavelength of the light source used, and which provides a high resolution image and a rapid scan of the specimen (sample) without altering or damaging the specimen.

BACKGROUND OF THE INVENTION

Far field optical microscopy, such as fluorescence microscopy, has become a major research tool in basic biomedical research and an effective diagnosis technique in clinical medicine. However, the need for high spatial resolution and signal sensitivity has so far severely limited the effectiveness of this far field method, and in fact, all optical microscopy related research. Similar limitations are also present when used in clinical applications. Presently, the far field technique has found broad applications in a number of areas, such as cancer cell detection, characterization of cell abnormalities and evaluation of fundamental processes involving the localization and function of membrane associated proteins, such as ion channels and surface receptors.

Unfortunately, further improvement in far field optical microscopy is limited by the diffraction limit of light. Currently available optical microscopes place the specimen on the image plane of the optical system (i.e., located at a distance far exceeding that of the wavelength). Yet diffraction limits the spot size formed in the case of a scanning beam type of microscope or the smallest features that can be resolved in the case of an imaging system. Therefore, the highest resolution of a conventional optical microscope is in the sub-$\mu$m range, even when used with a confocal system.

Far field optical microscopy, regardless of the contrast mechanism being used (i.e., fluorescence, phase contrast or differential interference), is severely limited by the finite wavelength of light due to the unavoidable effect of diffraction. As such, the spatial resolution, either vertical to the plane of focus or lateral in the plane of focus, is roughly in the range of $\lambda$/N.A., where $\lambda$ is the wavelength of the illumination (~0.5 $\mu$m) and N.A. is the numerical aperture which can be up to 1.4. Higher resolution, along with improved signal collection efficiency, would significantly enhance the use of the optical technique.

To overcome this fundamental difficulty, a type of microscopy known as Near Field Scanning Optical Microscopy (NSOM or SNOM) technology has been developed. Rather than placing the specimen at a far distance from the light source, a near field scanning optical microscope (NSOM) places the specimen directly in front of the light source at a distance far smaller than the wavelength of light (i.e.,"near field"). Since the physical size of the light source can be below the wavelength of the light, the spatial resolution would be limited by the size of the aperture. In this case, the illuminated area is no longer limited by diffraction. Therefore, by reducing the size of the light source (aperture), the volume being illuminated can be reduced accordingly. When such a light source is scanned over the specimen surface a two-dimensional image is obtained. Thus the system achieves the functions of a microscope. Since the resolution is directly related to the volume being illuminated, the resolution can be reduced to below that determined by diffraction.

Many techniques have been developed for fabrication of such small apertures. Normally a glass optic fiber can be pulled with laser heating to produce a very sharp apex, which can be coated with metal to make a small aperture at the end of the pulled fiber. Since only a very small volume is illuminated during the operating mode of a NSOM, a scanning mechanism must be used to acquire a two dimensional image. Since the image is obtained sequentially, the entire emission angle of $4\pi$ is available for signal collection in the case of fluorescence imaging, thus improving the collection efficiency. This is an important practical factor to consider when taking into account the effects of photo-bleaching and frame-time for image acquisition.

To make a NSOM instrument useful, the position of the probe aperture must be precisely controlled to avoid crashing the probe into the specimen. It is also important to ensure the image contrast is due to fluorescence rather than variations of the distance between the probe and the specimen (sample) surface. When operated in air, distance control can be achieved using a vibrating probe sensitive to the probe sample interaction or other methods. As such, the NSOM technique and its variations do not satisfy the applications required by biomedical research and clinical medicine. This is because most biologically relevant applications need the specimen to remain fully hydrated, preserving its native structure and function. When a conventional NSOM probe is placed in aqueous solution, the viscosity of the media produces a much lower Q value in the vibrating device, rendering it completely insensitive to the minute probe-specimen interactions. NSOM has therefore had very little success when applied to biological systems.

For some NSOM devices, pulled optical fibers are used as a conduit for the light source. The optical fiber surface is coated with a thin layer of metal to render it optically opaque but the apex of the fiber remains open (acting as the aperture) to allow for the transmission of light. It has been possible to fabricate apertures as small as 10 nm. However, as mentioned above, a critical feature that is required to make the NSOM a practical instrument is the method of maintaining the position of the aperture at a fixed distance from the specimen surface during scanning. Otherwise, the surface topography will have a profound effect on image contrast, creating artifacts that cannot be separated from the optical information. Even though many schemes of controlling the probe position have been demonstrated, the most successful design thus far is based on shear force detection. Here, the probe is driven to laterally oscillate at its resonant frequency. When the aperture is near the specimen, the interaction between the probe and the specimen surface will produce a shift in the resonant frequency, leading to a change in the oscillation amplitude. Therefore, by locking on to a predetermined reduction in amplitude, the distance between the probe and specimen can be controlled. It is intended that the resulting optical signal is independent from surface topography when this separation distance can be precisely controlled. As mentioned earlier, the above-mentioned conventional NSOM devices do not work in solution.

As such, conventional NSOM technology has a number of drawbacks. As mentioned previously, a major application of optical microscopy is in the field of biology and biomedicine, including disease diagnosis and fundamental research. Most of these applications require that the specimen or the sample be completely immersed in aqueous environment in order to retain full specimen functionality. To the detriment of the conventional NSOM technologies, including the conventional shear force technique, when the optical probe is immersed in solution, the probe Q value (a value directly related to the sharpness of the resonance peak or quality of the resonance is diminished. Yet, the shear force technique detection requires a reasonably high Q value so as to prevent the probe from crashing into the specimen before a frequency or amplitude shift could be detected. This is a fundamental limitation of most mechanically based NSOM detection schemes. Therefore, truly high resolution NSOM imaging of biological specimens in aqueous solution have not been known despite many years of effort by numerous research groups and industrial laboratories. For these reasons, the NSOM technology has not had a major impact on the fields of biology and biomedical research. Without solving the above-mentioned technological limitations, the conventional NSOM approach will be ineffective in entering the main stream of biomedicine.

There is therefore a need in the art for an effective NSOM that provides a high resolution image of a specimen (sample) in an aqueous solution and a rapid scan(i.e., brief frame-time) of the specimen without altering or damaging the specimen.

SUMMARY OF THE INVENTION

According to the present invention, a near field scanning optical microscope (NSOM) comprises: a reservoir holding a sample to be scanned therein; a pipette having an open tip communicating with a hollow shaft; an electrolyte solution disposed within the reservoir covering the sample and disposed within the tip of the pipette; a first electrode disposed in the shaft in iconic communication with the electrolyte solution in the open tip, the first electrode being in ionic communication with electrolyte solution in the reservoir via the open tip by means of electrolyte solution within the tip; a second electrode disposed in the reservoir in ionic communication with the electrolyte solution in the reservoir and forming a continuous ionic current path between the first and second electrodes via the electrolyte solution in the reservoir and in the open tip, scanning means for scanning the tip of the pipette over a top surface of the sample in a scanning pattern; voltage means for applying a voltage across the first and second electrodes; current means for measuring a current flowing in the ionic current path between the first and second electrodes through the open tip of the pipette and for supplying an indication of the current at an output thereof; and control logic means having an output connected to the scanning means and an input connected to the output of the current means for causing the scanning means to set the height of the tip at a desired distance above the top surface. The present invention further comprises a light source disposed on the microscope for emitting light through the shaft of the pipette and onto the sample; the hollow shaft being opaque to substantially prevent light emitted from the light source from being transmitted through the walls of the shaft; and an image acquisition means in optical communication with the light source so that the sample is in optical communication between the light source and the image acquisition means, whereby the image acquisition means for acquiring an image of the sample.

Another aspect of the invention provides a method for optically imaging a sample comprising the steps of: disposing the sample to be scanned in a reservoir containing an electrolyte covering the sample; providing a pipette having an open tip communicating with a hollow shaft, wherein the shaft is at least partially opaque; disposing an electrolyte within the tip of the pipette; disposing a first electrode in the shaft in ionic communication with the electrolyte in the open tip; disposing a second electrode in the reservoir in ionic communication with the electrolyte in the reservoir and forming a continuous ionic current path between the first and second electrodes via the electrolyte solution in the reservoir and in the open tip; applying a voltage across the first and second electrodes and measuring an ionic current flowing in the ionic current path between the first and second electrodes through the open tip; scanning the tip of the pipette over a top surface of the sample in a scanning pattern with the tip of the pipette at a desired distance above the top surface which will maintain the current flow between the first and second electrodes through the open tip at a constant value which will cause the tip to follow the top surface in close non-contacting proximity thereto so as to provide a z-directional component of the position of the tip of the pipette; scanning the tip of the pipette over a top surface of the sample in a scanning pattern with the tip of the pipette in a plane parallel and close adjacent above the top surface; emitting light through the shaft of the pipette onto the sample; and acquiring light having been transmitted through the sample for acquiring an image of the sample and outputting a corresponding acquisition signal.

BRIEF DESCRIPTION OF THE DRAWINGS

The foregoing and other objects, features and advantages of the present invention, as well as the invention itself, will be more fully understood from the following description of preferred embodiments, when read together with the accompanying drawings in which:

FIG. 6(A) is a simplified elevational view of a multi-bore pipette of the present invention NSOM.

FIG. 6(B) is an isometric view of the NSOM of FIG. 6(A).

DETAILED DESCRIPTION OF THE INVENTION

Figure 1:
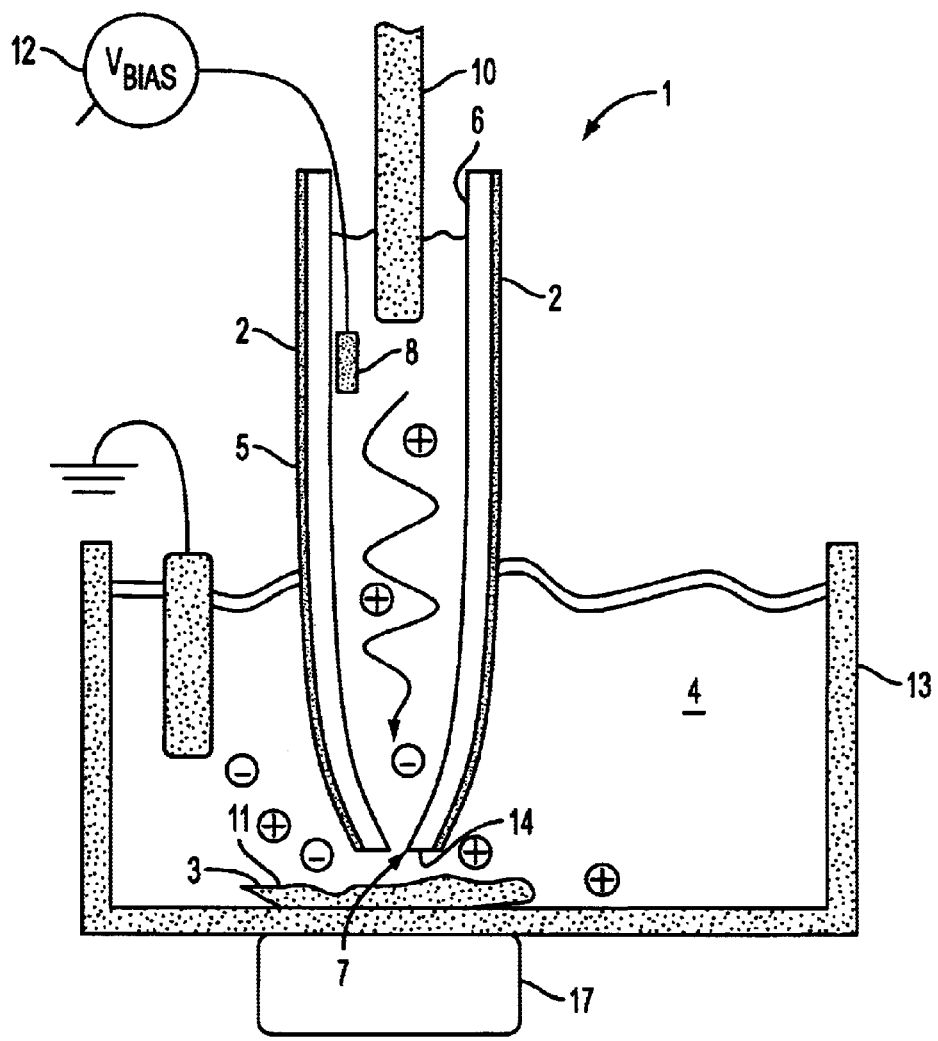
FIG. 1 is a simplified elevational view of the light source incident upon the sample immersed in the solution.
Figure 3:
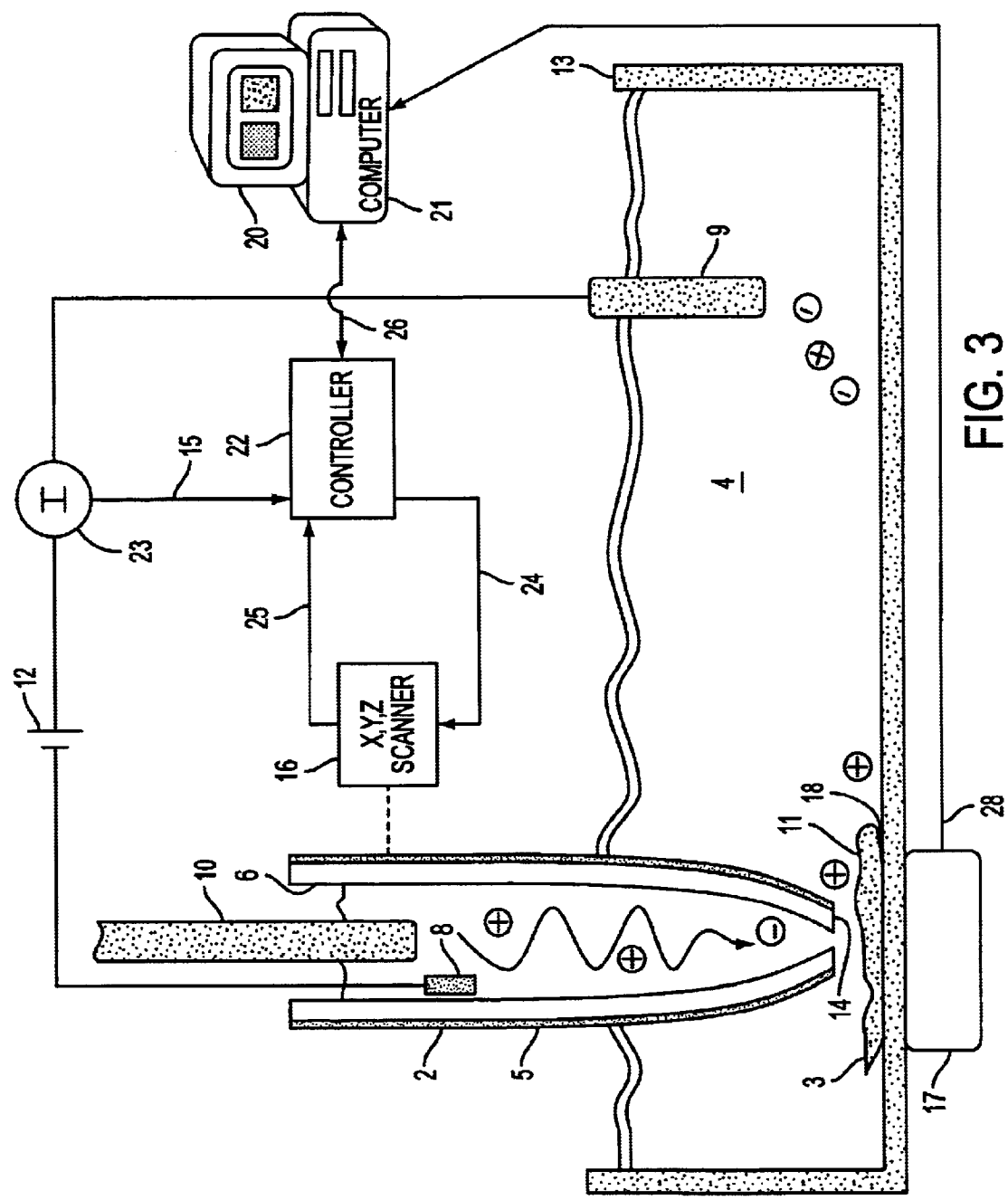
FIG. 3 is a simplified schematic drawing of the NSOM when operated to acquire a high resolution image.

Referring to FIGS.1 and 3 there is shown a schematic view of the first preferred embodiment of the present invention NSOM where it is generally indicated as 1. The present invention NSOM provides a high resolution image of a sample in solution that can rapidly scan the sample. A particular feature of the NSOM 1 is its reliable system to control the distance between the metal coated or optically opaque pipette 2 (probe) and the sample 3 in the aqueous solution 4, electrolyte-filled.

As known in scanning ion conductance microscope (SICM) technology, as illustrated by U.S. Pat. Nos. 4,924,091 and RE34,708 Hansma et al., and hereby incorporated by referenced in its entirety, the electrolyte-filled pipette 2 is scanned over the surface of a sample 3 bathed in the aqueous solution 4. The distance between the pipette 2 and the sample 3 is maintained at a constant value by controlling the ion current as will be discussed in greater detail below.

Figure 2:
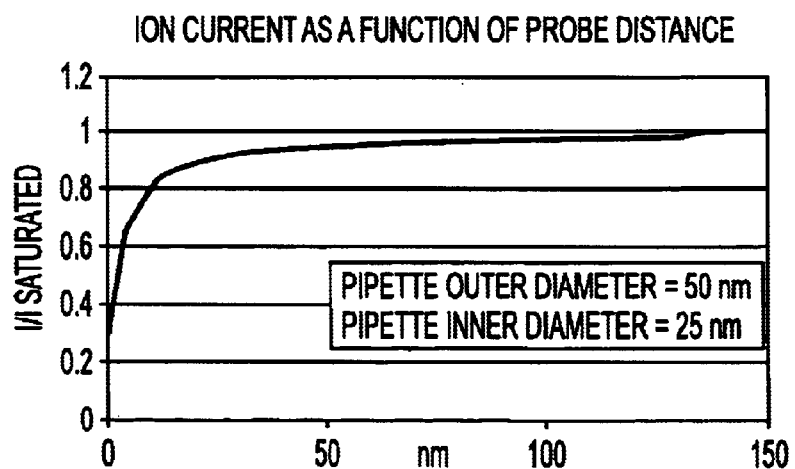
FIG. 2 is a graph illustrating the relationship of the ion current versus distance between the pipette and the sample.

Referring to FIGS. 1 and 3, the pipette 2 has an opaque coating 5, that may be on the interior wall or exterior wall of the shaft 6. Such a coating may be chromium or aluminum, but not limited thereto. The diameter of the pipette 2 is preferably kept small, with the tip opening 7 having an optical passage down to less than 50 nm in order to achieve high optical resolution. The ionic passage is even smaller, in the range of 20–40 nm. An electrode 8 (e.g., comprised of silver or silver-chloride) is coupled to the lumen of the pipette 2 through the use of a high salt agar bridge to maintain its electrical stability and to reduce contamination from the environment. Optical illumination is delivered using an optical fiber coupled to a light source 10 chosen for its wavelength. It is contemplated that a variety of light sources may be used such as lasers, laser diodes, LEDs, Mercury lamps and the like. In addition to fibers, the present invention can also be coupled with a focusing lense. This is sufficient for single photon and multiphoton fluorescence applications. When a bias voltage 12 is applied between the electrode 8 in the pipette and a second electrode 9 in the reservoir 13, free ions will be driven to flow. This results in a net current possessing an exponential relationship with the distance between the tip 14 and the surface 11 of the sample 3, as shown in FIG. 2.

Figure 4:
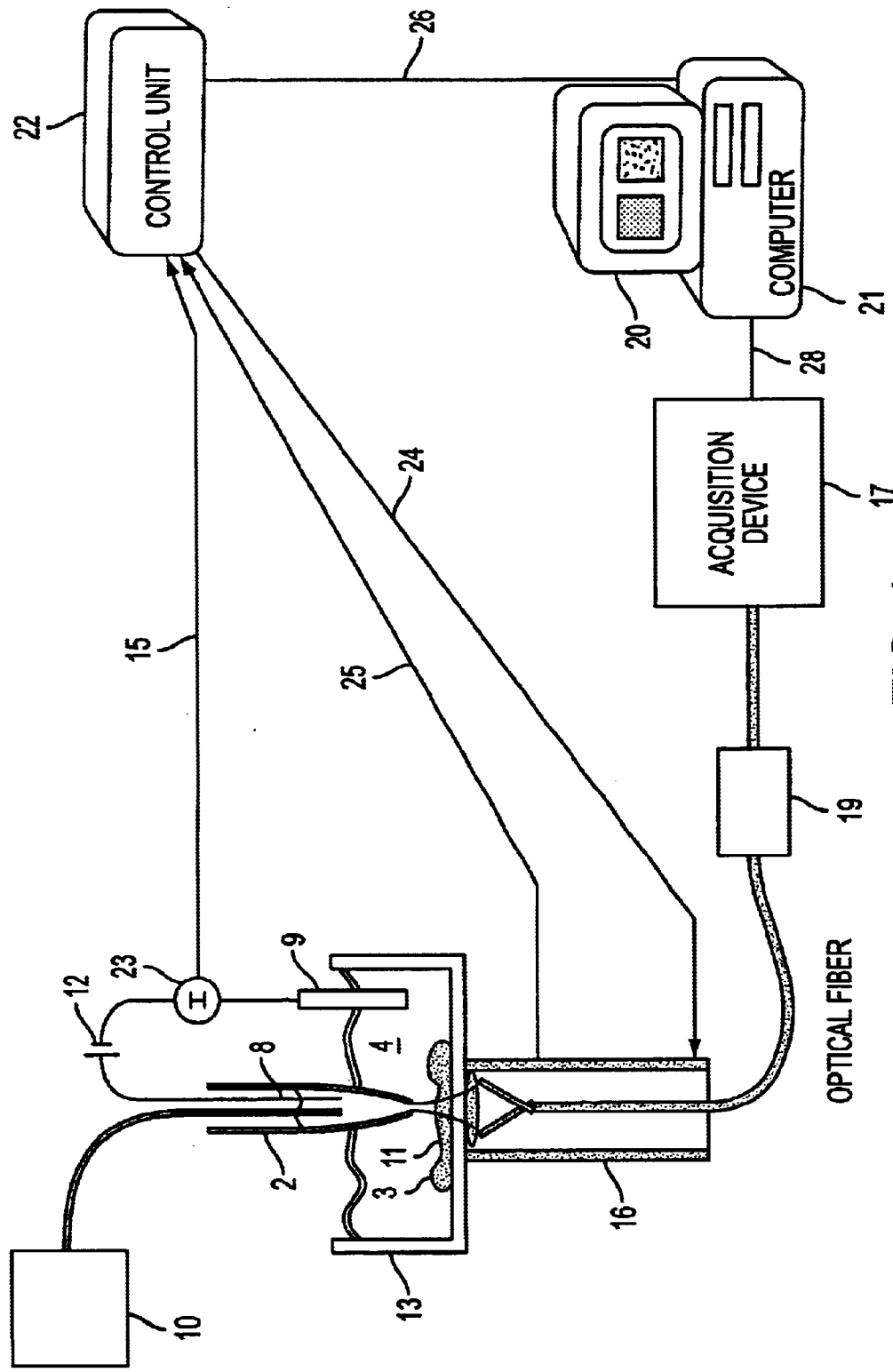
FIG. 4 is an alternate embodiment of the NSOM of FIG. 4.

This ion current is transmitted by line 15 to the controller 22 to control the movement of the scanning device 16, so as to maintain a constant distance between the probe tip 14 and the sample 3. The movement of the scanning device 16 is therefore related to the topography of the sample 3. An optical signal is obtained using a signal detecting device 17 (image acquisition device), such as a photomultiplier tube or CCD, placed below the transparent specimen substrate 18 directly or coupled through a microscope objective. It is contemplated that the acquisition device may be a number of devices including, photodiodes, arrays, CCDs, CMOS, or the like. With a large photosensitive cathode, the collection efficiency can be as high as 40%. For transmission contrast, no filter is needed between the detector 17 and the sample 3. But for fluorescence imaging, a filter 19 of the chosen band-pass may be inserted in between (as shown in FIG. 4). The signal from the image acquisition device 17 is digitized and displayed side by side with the topographical image on the monitor 20 of the computer 21. The quantum efficiency of the detection system can be up to 100%. Alternatively, an ordinary fluorescence microscopy objective can be placed below the specimen 3. In this case, conventional optical imaging can be performed on the same specimen 3, and the signal collection can be performed through the camera port (not shown).

Referring to FIGS. 3 and 4 the bias voltage source 12 is connected to the electrodes 8 and 9 and a current measuring transducer 23 is placed in series with the bias voltage source 9 to measure the current flowing and provide an indicative signal thereof to the controller 22 on line 15. The controller 22 performs numerous processing and logic functions, including first controlling the scanning device 16 over line 24. Secondly, the controller 22 receives a z-positional feedback signal from the scanning device 16 over line 25. Finally, the controller outputs data on line 26 employed to visualize the scan results according to techniques well known in the art.

In operation, the pipette 2 is filled with an electrolyte solution 4 (aqueous solution) and lowered through the reservoir 13 toward the surface 11 of the sample 3 while the current between the electrode 8 inside the pipette 2 and the electrode 9 in the reservoir 13 is monitored. As the tip 14 of the pipette 2 approaches the surface 11, the ion current decreases because the space through which ions can flow is reduced. The pipette 2 is then scanned laterally over the surface 11 while the feedback system comprising the scanning device 16 (e.g., piezoelectric scanner) and the control unit or controller 22 as described above raises and lowers the pipette 2 to keep the current constant. Therefore, the path of the tip of the pipette 2 follows the topography of the surface 11. As in prior art scanning microscopes, the z-directional signal developed in the process can be employed to display the surface topography in an manner desired as, for example, by displaying on the monitor 20 (such as a CRT with or without color and/or other enhancements) or by plotting on a plotter or printer, or the like.

An optical image is simultaneously provided as the light source 10 is incident on the sample and the emitted light reaches the image acquisition device 17 (e.g., PMT/spectrometer) after being transmitted through the sample 3. The acquisition device 17 converts the light energy into electrical signals and they are provided to the computer 21 on line 28 so that electrical signals developed in the process can display acquired images on the monitor 20 (e.g., display) or a printer.

To acquire an optical signal, the proper illumination wavelength by the light source 10 is selected. For two-photon imaging, this is even more critical due to the drastically reduced excitation efficiency. For a reasonable signal to noise ratio the input optical power must be optimized. A pulsed laser system would be beneficial for further decreasing susceptibility of heat damage to the probe 2 and enhancing image acquisition. The metal coating 5 of the pipette 2 must be intact; otherwise, background illumination will seriously degrade the quality of the data.

Alternatively, the pipette 2 may be stationary whereby the reservoir 13 holding the sample 3 is moved by the scanning device 16, as shown in FIG. 4, and thereby representing the second preferred embodiment of the present invention NSOM.

Figure 5:
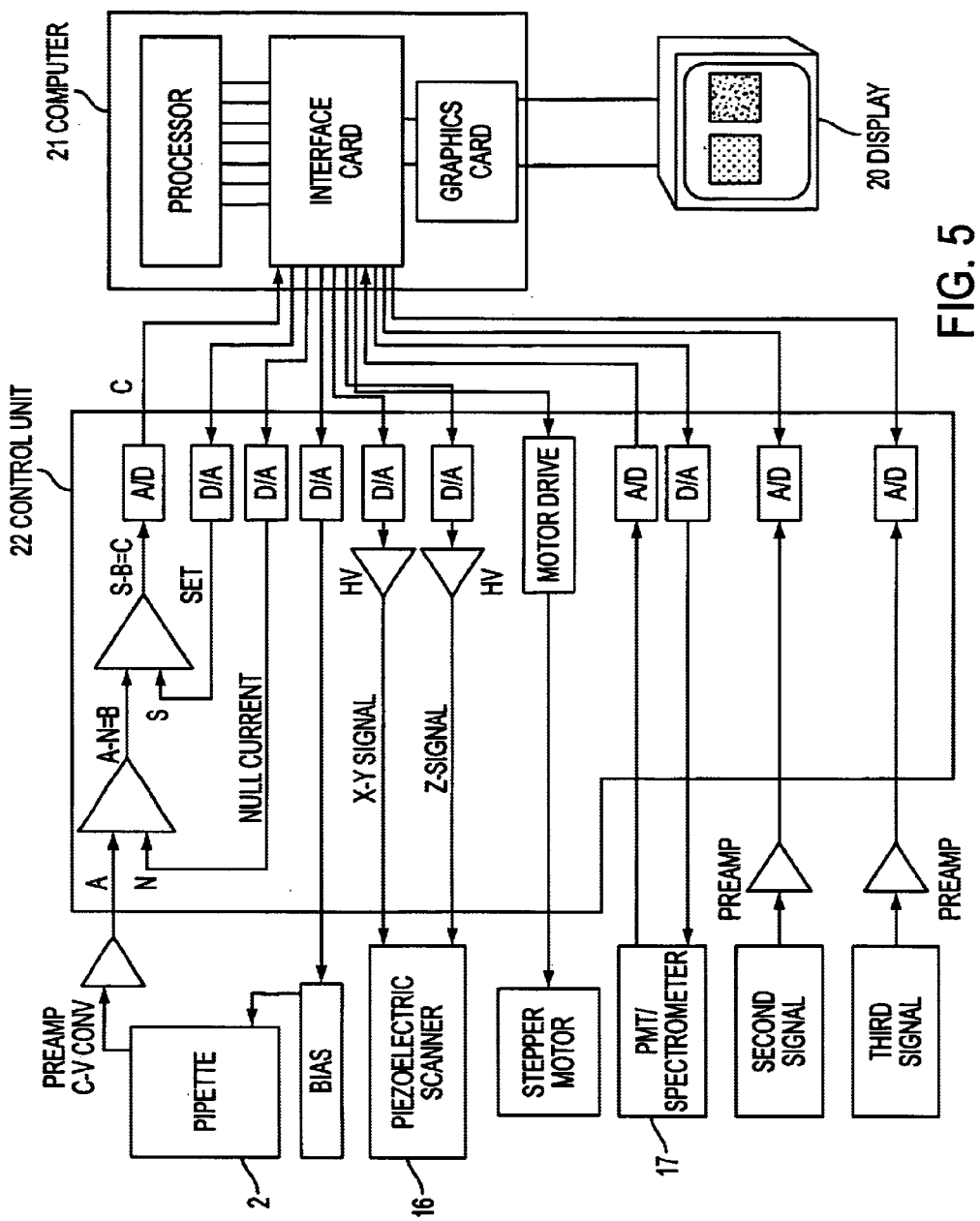
FIG. 5 is a schematic view of the major functional components of the NSOM system.

Referring to FIG. 5, some of the major functional components are included for illustrative purposes of the overall system. In contrast to conventional scanning probe instruments, a null function may be incorporated to null the current going into the preamplifier before the probe is near the specimen surface. When the basal current is reduced by the partial blockage of the ionic passage, the input current will be non-zero, which is compared with a pre-set voltage (equivalent to the amount of current reduction). When this pre-set voltage is reached, the system will consider the probe engaged to the specimen. This feature will make the system compatible with all other scanning probe microscope (SPM) controllers, either commercial or in-house. The difference between the input C and the set voltage S is used by the feedback system to control the z-position of the specimen (or the probe), thus maintaining a constant distance between the probe 2 and the sample surface 11. After engagement, the specimen 3 (or the probe) is raster scanned with a digitally generated signal that is synchronized with the display of the topographical image. Other signals are collected simultaneously through the other channels, and displayed in registration with the topographical image. The acquired data, along with the control parameters, are stored on the computer hard disk for off-line analysis and processing. All control parameters, such as the null current (N), the set voltage (S), PMT high voltage and gain, as well as the bias voltage required for ionic current, are digitally set through software control. One skilled in the art would appreciate that the related electronics and controls may be accomplished with the desired combination of hardware, software, or firmware, as well as utilizing wireless communication.

FIGS. 6(A) and 6(B) illustrate a third preferred embodiment of the present invention NSOM whereby signals other than optical and topographical are acquired. Using a multi-shaft pipette or multi-bore pipette 40 (a θ tubing is shown as an example) having a first electrode 8, one shaft 41 (or bore) is used to conduct ions, fulfilling the purpose of positional control and optical and topological imaging, as discussed above. Other shaft(s) 42 (or bores), however, can be provided to collect different types of information or secondary information. For example, vesicles 43 or membranes (flow inhibitors, blocking means, or the like) containing the acetylcholine receptor 44 may be fixed to the end opening of the second shaft 42. With a proper permeabilization of the membrane in the pipette 2, this can be used to detect released neurotransmitters by incorporating a second electrode 45 in the lumen, because the neurotransmitter acetylcholine causes the opening of the receptor 44, resulting in minute current flow through the channel 46. The release site may then be identified and kinetically analyzed. Other sensors may also be used such as carbon fibers or immobilized enzymes. Another example is to link a molecule that contains a donor fluorophore. Using the method of fluorescence energy transfer, the acceptor molecule in the vicinity of the probe 40 can be detected.

Figure 7:
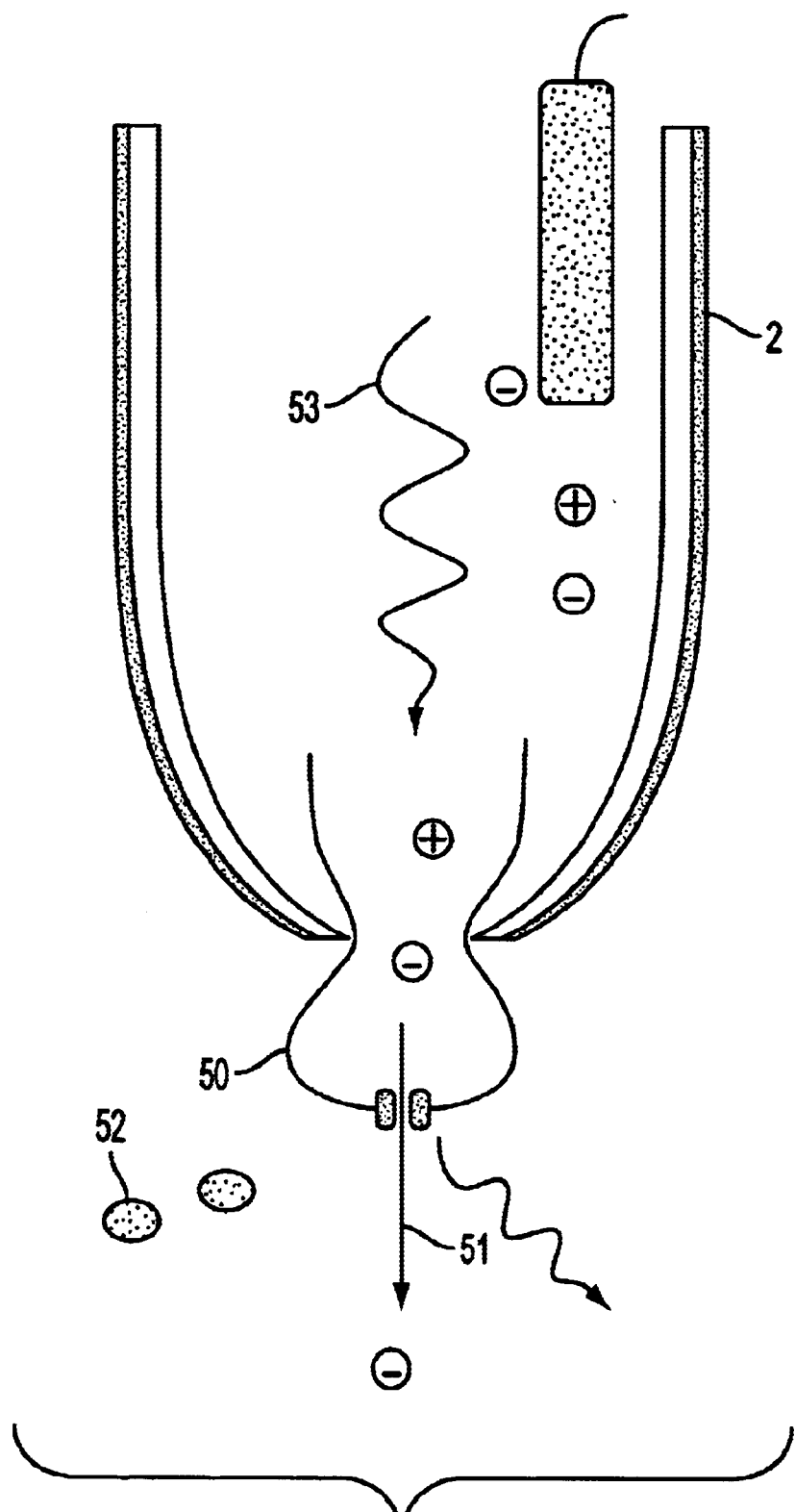
FIG. 7 is a simplified elevational view of the present invent including a pipette having an effected channel.

FIG. 7 illustrates a fourth preferred embodiment of the present invention NSOM as applied to non-imaging applications. Here, the coated pipette 2 is applied to an excised membrane patch 50 (flow inhibitor, blocking means or the like) containing a single ion channel 51 or other proteins of interest.

The pipette 2 is used to monitor the current of the channel 51 and to concurrently deliver light 53 to the membrane patch 50. Presumably, only the molecule in the patch 50 is illuminated. The molecule can be labeled with a particular fluorescent dye, so that an image acquisition device 17 (e.g., photomultiplier tube) will detect the particular wavelength emission. If a ligand 52 (or other protein) has the ability to close the channel 51, it may be added to the aqueous solution 4 and labeled with a different dye to quench the donor on the membrane. Any change in fluorescence would indicate the binding of this ligand 52 to the molecule. Subsequent changes in channel current would provide a correlation with channel functionality at the single molecule level. One skilled in the art would appreciate that other applications may be contemplated as well.

It is contemplated that another application of the present invention is for optical spectroscopy.

The embodiments described above provide a number of significant advantages. An advantage of the present invention NSOM 1, and related method thereof, is attributed to the ability to provide high resolution images of a sample 3 in aqueous solution without damaging the sample 3. This attribute will greatly expand the applications and utility of NSOMs in biomedicine. Moreover, the present invention can be further extended to include signals other than light.

Another advantage of the present invention NSOM is attributed to the brief frame-time required to acquire a high resolution image. As such, the present invention NSOM can rapidly scan the image thereby reducing the chance of the samples or cell structure changing or moving during the sampling period.

Yet another advantage of the present invention NSOM is that the optical image can be acquired without the risk of damaging the sample 3, unlike during the conventional prior art atomic force microscopes (AFMs) contact modes and the conventional NSOMs shear force contact modes.

Still yet another advantage of the present invention NSOM is that high spatial resolution may be obtained with an incident light significantly below the wavelength limit. Moreover, the present invention possesses improved signal collection efficiency.

Further yet, another advantage of the present invention NSOM is that it greatly reduces the susceptibility of overheating the probe, being that the image is obtained from a sample in aqueous solution which effects cooling of the probe.

Another advantage of the present invention NSOM is that it can simultaneously collect optical images, topographical images, functional information and other related secondary information. Further, the present invention device can collect signals other than fluorescence signals as it is extensible to non-imaging applications.

Finally, an advantage of the present invention NSOM is its ability to be fully compatible with conventional optical microscopy including confocal. The present invention device can also conduct two photon or multiphoton imaging.

As illustrative examples, and without limiting the diverse applications in which the present invention may be applied, the following examples are presented indicating some of the advantages of present invention.

EXAMPLE 1

Receptor Clustering in the Cell Membrane

It has been hypothesized that many membrane associated proteins may form localized domains, which may be critical for their function. As such, with a proper fluorescent label, the present invention NSOM may be used to acquire this information with live cells at a resolution sufficient to resolve small, dynamic domains in the plasma membrane.

EXAMPLE 2

Single Enzyme Function

It is known that both the membrane bound enzyme and the substrate may be fluorescently labeled with a different wavelength. Using the present invention NSOM, one can relate the turn over of the substrate with the enzyme location, resolving events from individual protein molecules in their native environment. This has not been achieved by any technique to date.

EXAMPLE 3

Cytoskeleton and Membrane Protein Distribution

It is known that the cytoskeleton and the targeted proteins can also be labeled with different wavelength dyes.

Therefore, the relationship between the cytoskeleton and the membrane protein can be resolved by using the present invention improved NSOM. It is believed that the cytoskeleton may play a critical role in the function of many membrane bound channels and receptors. It is possible that a difference may be detected between normal and abnormal cells (e.g., cancer cells).

EXAMPLE 4

Mapping of the Neurotransmitter Release Sites

When non optical signal is used, such as a membrane with a neurotransmitter receptor, the present invention improved NSOM as illustrated in FIGS. 6(A) and (B) may be used to identify the sites of release and its spatial structure.

EXAMPLE 5

Fluorescent Resonant Energy Transfer (FRET)

A final application is fluorescent resonant energy transfer (FRET) whereby an acceptor is disposed on the probe and a donor disposed on the sample so as to provide enhanced spatial resolution.

The invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims rather than by the foregoing description, and all changes which come within the meaning and range of equivalency of the claims are therefore intended to be embraced therein.

What is claimed is:

1. A near field scanning optical microscope (NSOM) comprising:

a reservoir holding a sample to be scanned therein;

a pipette having an open tip communicating with a hollow shaft;

an electrolyte solution disposed within the reservoir covering the sample and disposed within the tip of said pipette;

a first electrode disposed in said shaft in ionic communication with said electrolyte solution in said open tip, said first electrode being in ionic communication with electrolyte solution in said reservoir via said open tip by means of electrolyte solution within said tip;

a second electrode disposed in said reservoir in ionic communication with said electrolyte solution in said reservoir and forming a continuous ionic current path between said first and second electrodes via the electrolyte solution in said reservoir and in said open tip;

scanning means for scanning said tip of said pipette over a top surface of said sample in a scanning pattern;

voltage means for applying a voltage across said first and second electrodes;

current means for measuring a current flowing in the ionic current path between said first and second electrodes through said open tip of said pipette and for supplying an indication of said current at an output thereof; and control logic means having an output connected to said scanning means and an input connected to said output of said current means for causing said scanning means to set the height of said tip at a desired distance above said top surface;

wherein the improvement comprises:

a light source disposed on said microscope for emitting light through said shaft of said pipette and onto the sample;

said hollow shaft being opaque to substantially prevent light emitted from said light source from being transmitted through the walls of said shaft; and an image acquisition means in optical communication with said light source so that the sample is in optical communication between said light source and said image acquisition means, whereby said image acquisition means for acquiring an image of the sample.

2. The near field scanning optical microscope (NSOM) of claim 1 wherein:

said image acquisition means converts the acquired light into electrical signals for purpose of providing a high resolution image of the sample.

3. The near field scanning optical microscope (NSOM) of claim 2 wherein:

said control logic means includes logic for causing said scanning means to position said tip of said pipette at a distance above said top surface which will maintain the current between said first and second electrodes through said open tip of said pipette at a constant value which will cause said tip to follow said top surface in close non-contacting proximity thereto.

4. The near field scanning optical microscope (NSOM) of claim 3 wherein:

said control logic means includes logic for causing said scanning means to scan said tip of said pipette in a plane parallel and close adjacent above said top surface.

5. The near field scanning optical microscope (NSOM) of claim 4 wherein:

said control means for outputting data of interest related to said sample as it is scanned.

6. The near field scanning optical microscope (NSOM) of claim 5 further comprising:

feedback means connected between said scanning means and said control logic means for providing said control logic means with an indication of a z-directional component of the position of said tip of said pipette.

7. The near field scanning optical microscope (NSOM) of claim 6 wherein:

said data of interest output by said control logic means reflects the topography of said top surface.

8. The near field scanning optical microscope (NSOM) of claim 2 further comprising:

a plurality of said pipettes disposed to form a multi-bore pipette having respective tip openings;

a plurality of said first electrodes disposed in respective ones of said plurality of pipettes, each of said plurality pipettes being specific for a different function;

a first of said plurality of pipettes for optically imaging the sample;

a second of said plurality of pipettes for collecting secondary information; and said control logic means includes logic for causing said scanning means to position said tips of said multi-bore pipettes at a distance above said top surface which will maintain the current between said first electrode disposed in said optical imaging pipette and said second electrode through said open tip of said optical imaging pipette at a constant value which will cause said tips of said multi-bore pipettes to follow said top surface in close non-contacting proximity thereto.

9. The near field scanning optical microscope (NSOM) of claim 8 further comprising:

a flow inhibitor means is disposed at said tip opening of said secondary information pipette, wherein said flow inhibitor means effects the ion current flow of ion current through the tip opening of said secondary information pipette.

10. The near field scanning optical microscope (NSOM) of claim 9 wherein:

said flow inhibitor means is selected from the group consisting of a vesicle and membrane.

11. A method for optically imaging a sample comprising the steps of:

disposing the sample to be scanned in a reservoir containing an electrolyte covering the sample;

providing a pipette having an open tip communicating with a hollow shaft, wherein said shaft is at least partially opaque;

disposing an electrolyte within the tip of the pipette;

disposing a first electrode in the shaft in ionic communication with the electrolyte in the open tip;

disposing a second electrode in the reservoir in ionic communication with the electrolyte in said reservoir and forming a continuous ionic current path between said first and second electrodes via the electrolyte solution in said reservoir and in said open tip;

applying a voltage across the first and second electrodes and measuring an ionic current flowing in the ionic current path between the first and second electrodes through the open tip;

scanning the tip of the pipette over a top surface of the sample in a scanning pattern with the tip of the pipette at a desired distance above the top surface which will maintain the current flow between the first and second electrodes through the open tip at a constant value which will cause the tip to follow the top surface in close non-contacting proximity thereto so as to provide a z-directional component of the position of the tip of the pipette;

scanning the tip of the pipette over a top surface of the sample in a scanning pattern with the tip of the pipette in a plane parallel and close adjacent above the top surface;

emitting light through said shaft of said pipette onto the sample; and acquiring light having been transmitted through the sample for acquiring an image of the sample and outputting a corresponding acquisition signal.

12. The method of optically imaging the sample of claim 11, further compressing:

outputting data of interest which reflects the topography of the top surface.

13. The method of claim 11 further comprising the steps of:

a plurality of said pipettes disposed to form a multi-bore pipette having respective tip openings;

providing a plurality of said first electrodes disposed in respective ones of said plurality of pipettes, each of said plurality pipettes being specific for a different function, whereby a first of said plurality of pipettes for optically imaging the sample and whereby a second of said plurality of pipettes for collecting secondary information; and scanning said tips of said multi-bore pipettes at a distance above said top surface which will maintain the current between said first electrode disposed in said optical imaging pipette and said second electrode through said open tip of said optical imaging pipette at a constant value which will cause said tips of said multi-bore pipettes to follow said top surface in close non-contacting proximity thereto.

14. The near field scanning optical microscope (NSOM) of claim 2 further comprising:

a flow inhibitor means is disposed at said tip opening of said pipette, wherein said flow inhibitor means effects the ion current flow of ion current through the tip opening of said pipette.

15. The near field scanning optical microscope (NSOM) of claim 14 wherein:

said flow inhibitor means is selected from the group consisting of a vesicle and membrane.

* * * * *